United States Patent [19]

Frey et al.

[11] Patent Number: 4,731,532

[45] Date of Patent: Mar. 15, 1988

[54] TIME OF FLIGHT MASS SPECTROMETER USING AN ION REFLECTOR

[75] Inventors: Rüdiger Frey, Weyhe; Edward W. Schlag, Munich, both of Fed. Rep. of Germany

[73] Assignee: Bruker Analytische Mestechnik GmbH, Fed. Rep. of Germany

[21] Appl. No.: 875,476

[22] Filed: Jun. 18, 1986

[30] Foreign Application Priority Data

Jul. 10, 1985 [DE] Fed. Rep. of Germany ....... 3524536

[51] Int. Cl.$^4$ .............................................. B01D 59/44

[52] U.S. Cl. ..................................... 250/287; 250/286

[58] Field of Search ......................... 250/281, 286, 287

[56] References Cited

U.S. PATENT DOCUMENTS

| | | | |
|---|---|---|---|
| 3,727,047 | 4/1973 | Janes | 250/287 |
| 4,072,862 | 2/1978 | Mamyrin et al. | 250/286 |
| 4,295,046 | 10/1981 | Grütter et al. | 250/287 |
| 4,611,118 | 9/1986 | Managadze | 250/287 |
| 4,625,112 | 11/1986 | Yoshida | 250/287 |

FOREIGN PATENT DOCUMENTS

| | | | |
|---|---|---|---|
| 956450 | 1/1957 | Fed. Rep. of Germany | 250/287 |
| 2337118 | 7/1973 | Fed. Rep. of Germany . | |
| 3025764 | 7/1980 | Fed. Rep. of Germany . | |
| 3423394 | 6/1984 | Fed. Rep. of Germany . | |
| 3428944 | 8/1984 | Fed. Rep. of Germany . | |
| 2080021 | 1/1982 | United Kingdom | 250/287 |

OTHER PUBLICATIONS

Soviet Physics–Technical Physics, vol. 16, No. 7, 1972, pp. 1177–1179, Karataev et al., "New Method for Focusing Ion Buneches in Time-of-Flight Mass Spectrometers".

International Journal of Mass Spectrometry and Ion Physics, 46, 1983, pp. 63–66, C. Berger, "Compensator Role of the Electrostatic Mirror in Time of Flight Mass Spectrometry".

*Primary Examiner*—Bruce C. Anderson

[57] ABSTRACT

The ion reflector of the time of flight mass spectrometer comprises between the decelerating electrodes (27, 28) defining the decelerating field and the reflector electrode (29) an additional focusing electrode (30). Just as the focusing electrode (30), the deceleration electrodes (28, 28) are also preferably designed as grid-less diaphragm rings. Further, the front decelerating electrode arranged at the input of the ion reflector has preferably a larger aperture diameter than the rear decelerating electrode (28). The arrangement of the decelerating and focusing electrodes and the potentials applied to them are selected to ensure that an inhomogenous electric field is generated in the area of these electrodes which has the effect of a lens and which in conjunction with the following homogenous field which extends to the reflector electrode (29) ensures not only focusing in time, but also perfect geometrical focusing of the ion beam upon the detector.

8 Claims, 4 Drawing Figures

TIME OF FLIGHT MASS SPECTROMETER USING AN ION REFLECTOR

The present invention relates to a time of flight mass spectrometer using an ion reflector comprising a reflector electrode and two parallel decelerating electrodes arranged at a certain spacing in front of the said electrode to define a decelerating field.

A time of flight mass spectrometer of this type has been known already from U.S. patent specification No. 3,727,047, and a similar time of flight mass spectrometer has been described also by German patent application No. 34 28 944. The ion reflector formed by the grid electrodes of these known time of flight mass spectrometers serves the purpose to offset time differences resulting from different initial energies of the accelerated ions, with a view to improving the mass resolution of the spectrometer. However, even time of flight mass spectrometers equipped with such an ion reflector still do not meet the demands regarding sensitivity and resolution that have to be placed upon a unit which is to serve as a general laboratory unit and to permit mass-spectrometric examinations to be carried out also by people who, though skilled in the art, are not particularly specialized in this field. It is, therefore, the object of the present invention to improve the known time of flight mass spectrometers so that, while being of simple design, they exhibit improved resolution and sensitivity.

This object is achieved according to the invention by an arrangement in which there is arranged between the rear decelerating electrode neighboring the reflector electrode and the latter a focusing electrode designed as a grid-less diaphragm ring and carrying a higher potential than would correspond to the linear increase in potential from the rear decelerating field electrode to the reflector electrode.

The installation of the grid-less diaphragm ring and the application on this diaphragm ring of an increased potential leads to the formation of an inhomogenous electric field in the area of the focusing electrode which field, provided the inner diameter of the diaphragm ring and the potential are properly sized, not only focuses the ion beam in time, but effects in addition mass-independent geometric focusing of the ion beam which permits the detector surface to be reduced. This in turn reduces the differences in the path lengths of the individual ions resulting from insufficient spatial focusing, which would otherwise contribute to a lack of definition of the mass resolution, and at the same time the signal-to-noise ratio and, thus, the sensitivity of the time of flight mass spectrometer is also improved.

In the case of the time of flight mass spectrometers known heretofore it was regarded as necessary to design the decelerating electrodes as grids because one considered a very homogenous electric field as a precondition for ensuring identical focusing in time over the whole cross-section. Actually, it has, however, been found that the inhomogeneity caused by the focusing electrode can be adjusted in such a manner that optimum focusing, both in time and geometrically, can be achieved. Such optimum conditions can be reached even when the decelerating electrodes, just as the focusing electrodes, are designed as grid-less diaphragm rings. Designing the decelerating electrodes as grid-less diaphragm rings is not only possible, but rather extremely advantageous because this makes it possible to do without expensive and highly sensitive components of the kind of grids and avoids, in addition, the transmission losses resulting from such grids. For, even if the transmission rate of such grid electrodes for the ion beam is as high as 80%, the intensity of the ion beam, after having passed such a grid four times, will have been reduced to 40% of its initial intensity, which leads to a corresponding loss in sensitivity. Hence, by designing the decelerating electrodes as grid-less diaphragm rings, one achieves not only a simplification of the time of flight mass spectrometer, but also an improvement of its sensitivity.

The deliberate generation of an inhomogenous electric field in the area of the decelerating electrodes also provides the possibility to influence the inhomogeneity of the electric field through the geometry of the decelerating electrodes. It has been found to be particularly advantageous in this connection if the front decelerating electrode is given a larger aperture diameter than the rear electrode. Considering that the inhomogeneity of the electric field required for geometrical focusing must be exactly defined as regards value and shape and, further, that focusing in time must, as in the known time of flight mass spectrometers, comprise a flight path with homogenous field strength distribution, the time of flight mass spectrometer according to the invention may also include a number of linearizing electrodes which, instead of being arranged between the rear decelerating electrode and the reflector electrode, are arranged by analogy between the focussing electrode and the reflector electrode.

The electrode potential can be determined in the conventional manner by the resistors of a voltage divider which interconnect each pair of neighboring electrodes of the ion reflector electrically.

The invention will be described and explained hereafter in greater detail by way of the examples shown in the drawing. It is understood that the features that can be derived from the specification and the drawing may be used in other embodiments of the invention either alone or in any desired combination thereof. In the drawing FIG. 1 shows a diagrammatic representation of a time of flight mass spectrometer according to the invention;

Figure 1:
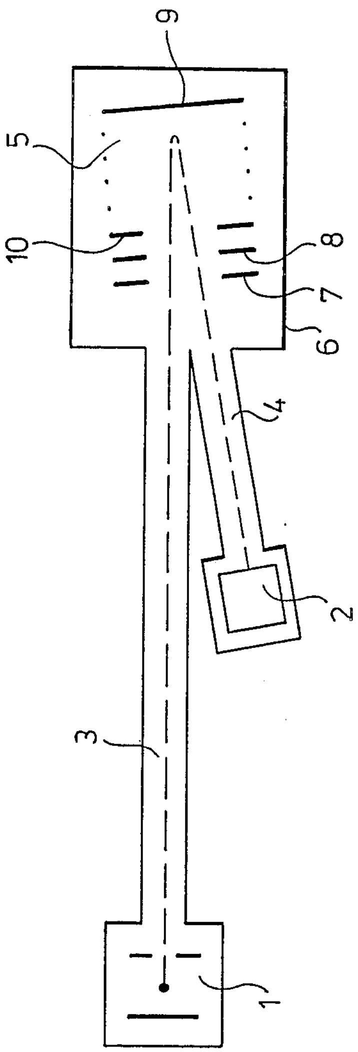

The time of flight mass spectrometer shown diagrammatically in FIG. 1 comprises an ion source 1 and a detector 2 which are interconnected by flight paths 3, 4 enclosing between them an acute angle. An ion reflector 5 is provided in the area of the intersection of the two paths 3, 4. All components are enclosed in an envelope 6 that can be evacuated. The ion reflector 5 comprises two decelerating electrodes 7, 8 arranged at the inlet of the ion reflector 5, the front decelerating electrode 7 delimiting the paths 3, 4 in which the electric field has no gradient. Between the decelerating electrodes 7, 8 there is an electric field which heavily decelerates the ions before they enter the reflection path extending between the rear decelerating electrode 8 and the reflector electrode 9. According to the invention, a focusing electrode 10 arranged between the rear decelerating electrode 8 and the reflector electrode 9 gives rise to an inhomogeneous electric field forming an electrostatic lens which focuses the ion beam geometrically upon the detector 2.

Figure 2:
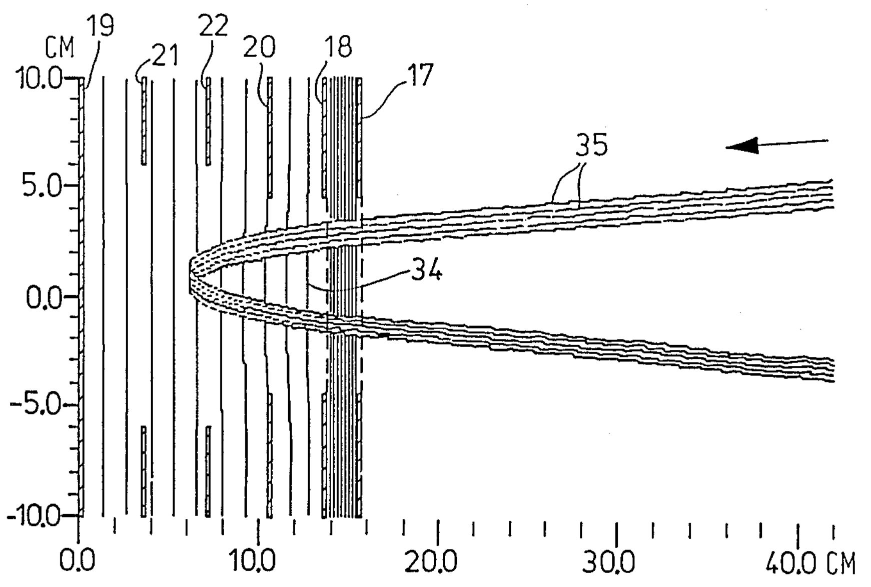
FIG. 2 shows the electrode arrangement of the ion reflector of a first embodiment of the invention.

In the electrode arrangement shown in FIG. 2, the two decelerating electrodes 17, 18 take the form of grid electrodes. Between the rear decelerating electrode 18 and the reflector electrode 19 formed by a level plate, the focusing electrode 20 can be seen which is designed as a diaphragm ring. Two linearizing electrodes 21 and 22 are provided between the focusing electrode 20 and the reflector electrode 19. The outer diameter of all electrodes is 200 mm. Generally, the structure of the ion reflector is characterized by the following values:

| Electrode | Position of axis | Inner dia. | Potential |
|---|---|---|---|
| 19 | 0 mm | plate | 860 V |
| 21 | 35 mm | 120 mm | 753 V |
| 22 | 70 mm | 120 mm | 646 V |
| 20 | 105 mm | 90 mm | 543 V |
| 18 | 135 mm | grid | 430 V |
| 17 | 155 mm | grid | 0 V |

Figure 3:
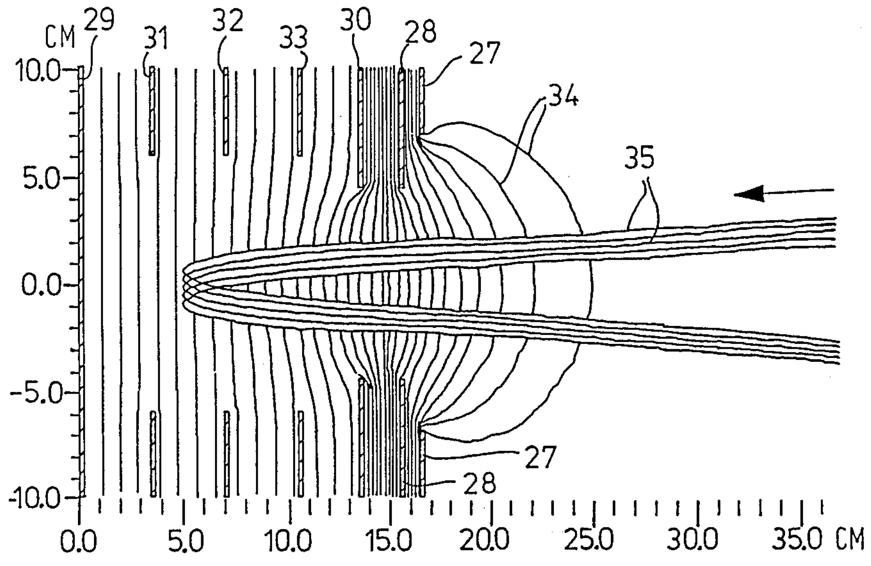
FIG. 3 shows the electrode arrangement of the ion reflector of a second embodiment of the invention.

In the ion reflector shown in FIG. 3, the decelerating electrodes 17, 18 designed as grids are replaced by decelerating electrodes 27, 28 which also take the form of diaphragm rings. In addition, three linearizing electrodes 31, 32, 33 taking the form of diaphragm rings are arranged between the focusing electrode 30 and the reflector electrode which is again designed as a closed plate. The electrodes of the ion reflector shown in FIG. 3 exhibit the following values:

| Electrode | Position of axis | Inner dia. | Potential |
|---|---|---|---|
| 29 | 0 mm | plate | 812 V |
| 31 | 35 mm | 120 mm | 718 V |
| 32 | 70 mm | 120 mm | 624 V |
| 33 | 105 mm | 120 mm | 530 V |
| 30 | 135 mm | 90 mm | 450 V |
| 28 | 155 mm | 90 mm | 200 V |
| 27 | 165 mm | 140 mm | 0 V |

Figure 4:
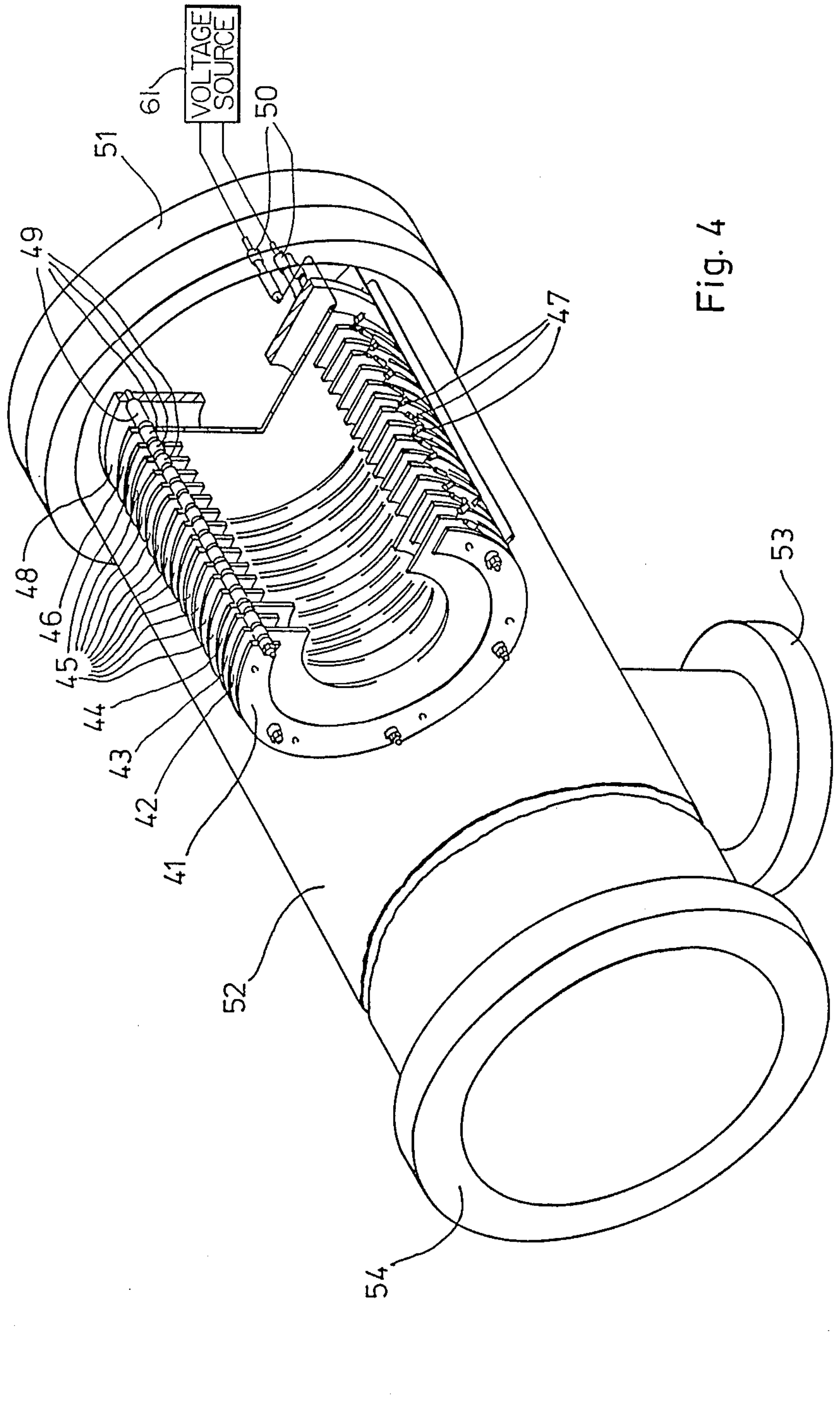
FIG. 4 is a diagrammatic perspective view of another embodiment of an ion reflector.

Both ion reflectors provide perfect focusing, both in time and geometrically, for an ion energy of 680 V, an angle of incidence of the ion path of 4° and a drift path length of 165 cm. The shape and position of the equipotential surfaces providing a lens effect, and the focusing effect upon the ion beam are indicated in FIGS. 2 and 3 by the potential lines 34 and the path lines 35. FIG. 4 finally illustrates the mechanical structure of an ion reflector according to the invention. The ion reflector comprises electrodes 41 to 46 in the form of diaphragm rings mounted by means of short ceramic tubes 49 on a carrier plate 48. The carrier plate 48, with the electrode system mounted thereon, is located inside a vacuum vessel 52 provided with a pipe end 53 for connection to a vacuum pump and a flange 54 for connection of the envelope to the remaining components of the time of flight mass spectrometer. The end of the vacuum vessel 52 opposite the flange 54 is equipped with a supporting flange 51 to which the carrier plate 48 with the electrode system mounted thereon is fixed and which is provided with vacuum lead-throughs 50 permitting defined potentials to be applied to the electrodes. To say it more precisely, the vacuum lead-throughs 50 serve to apply potential from a voltage source 61 connected to lead through 50 to a voltage divider constituted by resistors 47 interconnecting each one pair of neighbouring electrodes 41 to 46. The values of the resistors 47 are selected to ensure that the potential distribution resulting from the table below is achieved. This table also shows the inner diameters and the positions of the electrode axes. For an inner diameter of the vacuum vessel 52 of 200 mm, the outer diameter of the diaphragms is equal to 170 mm in this case. The desired focusing, in time and geometrically, is again achieved for an ion energy of 680 eV, an angle of incidence of the ion beam of 4° and a drift path length of 165 cm.

| Electrode | Position of axis | Inner dia. | Potential |
|---|---|---|---|
| 41 | 145 mm | 140 mm | 0 V |
| 42 | 155 mm | 90 mm | 200 V |
| 43 | 145 mm | 120 mm | 325 V |
| 44 | 135 mm | 90 mm | 450 V |
| 45 | 12 diaphragms equidistant between 44 and 46 | 120 mm | determined by resistor chain of 13 × 500 kOhms |
| 46 | 0 mm | plate | 812 V |

The values shown in the above table have been calculated using a computer. It goes without saying that the ideal values for diaphragm diameters and spacings, as well as the potential distribution, can be determined also by means of the usual algorithms for other marginal conditions consisting of the ion energy, the angle of incidence of the ion beam and the drift path length.

We claim:

1. A time-of-flight mass spectrometer, comprising:
   - ion source means for generating accelerated ions along a flight path;
   - ion reflector means positioned along said flight path for receiving and reflecting said ions, said ion reflecting means including first and second decelerating electrodes sequentially spaced along said flight path substantially parallel to a reflector electrode displaced furthest along said flight path at a distance from said second deceleration electrode, each of said electrodes receiving voltage signals;
   - means for focusing said ions including a gridless diaphragm ring electrode receiving voltage signals positioned along said flight path between said reflector electrode and said second decelerating electrode; and
   - voltage source means for providing said voltage signals each at selected voltage magnitude increasing from said first decelerating electrode to said reflector electrode, generating between said back decelerating electrode and reflector electrode a voltage linearly proportional to the displacement therebetween, said linearly proportional voltage being modified by a focusing electrode voltage selected to have a magnitude greater than the corresponding linearly proportional voltage magnitude.

2. Time of flight mass spectrometer according to claim 1, wherein the said decelerating electrodes are also designed as grid-less diaphragm rings.

3. Time of flight mass spectrometer according to claim 2, wherein the front decelerating electrode has a larger aperture diameter than the rear electrode.

4. Time of flight mass spectrometer according to claim 1, wherein a number of linearizing electrodes is arranged between the said focusing electrode and the said reflector electrode.

5. Time of flight mass spectrometer according to claim 1, wherein each pair of electrodes of the said spectrometer is interconnected electrically by the resistors of a voltage divider determining the electrode potential.

6. Time of flight mass spectrometer according to claim 1, wherein the front decelerating electrode has a larger aperture diameter than the rear electrode.

7. Time of flight mass spectrometer according to claim 1, wherein there is provided between the said focusing electrode and the said reflector electrode a number of grid-less diaphragm rings forming the linearizing electrodes.

8. Time of flight mass spectrometer according to claim 1, wherein each pair of neighboring electrodes of the said spectrometer is interconnected electrically by the resistors of a voltage divider determining the electrode potential.

* * * * *